United States Patent
Sekine et al.

(10) Patent No.: US 12,548,967 B2
(45) Date of Patent: Feb. 10, 2026

(54) OPTICAL AMPLIFICATION DEVICE AND OPTICAL AMPLIFICATION METHOD

(71) Applicant: HAMAMATSU PHOTONICS K.K., Hamamatsu (JP)

(72) Inventors: Takashi Sekine, Hamamatsu (JP); Yuma Hatano, Hamamatsu (JP); Yuki Muramatsu, Hamamatsu (JP); Yasuki Takeuchi, Hamamatsu (JP); Yoshinori Tamaoki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 634 days.

(21) Appl. No.: 17/920,847

(22) PCT Filed: Jan. 15, 2021

(86) PCT No.: PCT/JP2021/001304
§ 371 (c)(1),
(2) Date: Oct. 24, 2022

(87) PCT Pub. No.: WO2021/220558
PCT Pub. Date: Nov. 4, 2021

(65) Prior Publication Data
US 2023/0261430 A1    Aug. 17, 2023

(30) Foreign Application Priority Data
Apr. 28, 2020 (JP) .................... 2020-079424

(51) Int. Cl.
*H01S 3/10* (2006.01)
*H01S 3/0941* (2006.01)
*H01S 3/1123* (2023.01)

(52) U.S. Cl.
CPC ........ *H01S 3/1003* (2013.01); *H01S 3/09415* (2013.01); *H01S 3/1123* (2023.01)

(58) Field of Classification Search
CPC .. H01S 3/1003; H01S 3/1302; H01S 3/10007; H01S 3/1123–127; H01S 3/10084–10092
See application file for complete search history.

(56) References Cited

U.S. PATENT DOCUMENTS 3,614,462 A * 10/1971 Lean ...................... H01S 3/1083
                                                             372/102
RE29,421 E * 9/1977 Scott ....................... H01S 3/117
                                                             359/305

(Continued)

FOREIGN PATENT DOCUMENTS

CN     109326949 A     2/2019
DE     4127407 A1 *    2/1993 ......... H01S 3/10092

(Continued)

OTHER PUBLICATIONS

International Preliminary Report on Patentability mailed Nov. 10, 2022 for PCT/JP2021/001304.

*Primary Examiner* — Joshua King
(74) *Attorney, Agent, or Firm* — Faegre Drinker Biddle & Reath LLP

(57) ABSTRACT

An optical amplification device includes: a laser medium that amplifies input light to generate output light; an excitation light source that supplies excitation light used for amplifying the input light, to the laser medium; a resonator that includes a pair of first optical elements and disposed to optically face each other with the laser medium interposed between the first optical elements and that resonates generated light generated in the laser medium through the supply of the excitation light; and an optical switch disposed on an optical path of the resonator between the pair of first optical elements.

7 Claims, 9 Drawing Sheets

(56) References Cited

U.S. PATENT DOCUMENTS

| | | | | | |
|---|---|---|---|---|---|
| 4,468,776 | A | * | 8/1984 | McLellan | H01S 3/2366 372/18 |
| 4,752,931 | A | * | 6/1988 | Dutcher | H01S 3/115 372/18 |
| 4,872,181 | A | * | 10/1989 | Johnson | H01S 3/115 372/98 |
| 5,325,380 | A | * | 6/1994 | Clendening | H01S 3/23 372/21 |
| 5,521,930 | A | * | 5/1996 | Suni | H01S 3/117 372/18 |
| 5,974,060 | A | * | 10/1999 | Byren | H01S 3/10092 372/19 |
| 6,172,801 | B1 | * | 1/2001 | Takeda | H04B 10/2912 359/341.43 |
| 6,757,096 | B2 | | 6/2004 | Schiller | |
| 2004/0100998 | A1 | * | 5/2004 | Palmer | H01S 3/082 372/9 |
| 2006/0268950 | A1 | * | 11/2006 | Kane | H01S 3/10092 372/30 |
| 2008/0170597 | A1 | * | 7/2008 | van der Veer | H01S 3/10092 372/29.011 |
| 2009/0059968 | A1 | * | 3/2009 | Luo | H01S 3/109 372/18 |
| 2010/0091359 | A1 | * | 4/2010 | Yamamoto | H01S 3/2325 359/347 |
| 2012/0026504 | A1 | * | 2/2012 | Yamada | H01S 3/10084 372/20 |
| 2015/0288134 | A1 | * | 10/2015 | Danielius | H01S 3/10023 372/12 |
| 2018/0034231 | A1 | * | 2/2018 | Tagliaferri | H01S 3/1305 |

FOREIGN PATENT DOCUMENTS

| | | | | |
|---|---|---|---|---|
| DE | 102015110035 B3 | * | 7/2016 | ......... H01S 3/10092 |
| EP | 1601068 A1 | | 11/2005 | |
| EP | 3588699 A1 | | 1/2020 | |
| JP | 2004-172230 A | | 6/2004 | |
| JP | 2004-221278 A | | 8/2004 | |
| JP | 2006186071 A1 | | 7/2006 | |
| JP | 2012-222072 A | | 11/2012 | |
| JP | 2014-022568 A | | 2/2014 | |
| JP | 2016-100359 A | | 5/2016 | |
| KR | 2016-0052415 A | | 5/2016 | |
| WO | WO-2006062744 A2 | * | 6/2006 | ......... B23K 26/0622 |
| WO | WO-2013017338 A1 | * | 2/2013 | ............. H01S 5/142 |
| WO | WO-2019120186 A1 | * | 6/2019 | ............... G02F 1/39 |

* cited by examiner

OPTICAL AMPLIFICATION DEVICE AND OPTICAL AMPLIFICATION METHOD

TECHNICAL FIELD

The present disclosure relates to an optical amplification device and an optical amplification method.

BACKGROUND ART

In an optical amplification device that amplifies light such as pulsed laser and outputs the amplified light, it is important to extract energy accumulated inside an amplification unit such as a laser medium, as laser light with high efficiency. However, it is difficult to completely extract the energy accumulated inside the amplification unit during laser amplification, and a large amount of energy remaining in the amplification unit after laser amplification is converted into thermal energy. The thermal energy can be removed by cooling the laser medium, but when a residual amount of the thermal energy is large, a problem such as an increase in the size of or an increase in the electric power consumption of a cooling device occurs.

To solve such a problem, for example, in an optical amplification device disclosed in Patent Literature 1, an optical branching unit such as a beam splitter is provided at a predetermined position on an optical path of an emission optical system and branches some of amplified light to generate branched light. Then, the branched light is incident on an amplification unit before the incidence of return light of output light, so that the branched light is amplified to consume excitation energy remaining in the amplification unit after the amplification of input light.

CITATION LIST

Patent Literature

Patent Literature 1: Japanese Unexamined Patent Publication No. 2004-221278

SUMMARY OF INVENTION

Technical Problem

In the above-described optical amplification device, consuming efficiently the excitation energy remaining in the amplification unit after the amplification of the input light, and suppressing the conversion of the excitation energy into thermal energy are required. In addition, in consuming the excitation energy, a scheme is also required that prevents the quality of the input light input to the amplification unit or of the output light amplified in the amplification unit from being affected.

The present disclosure is conceived to solve the foregoing problems, and an object of the present disclosure is to provide an optical amplification device and an optical amplification method capable of efficiently preventing thermal energy from remaining in an amplification unit without affecting the quality of input light or output light.

Solution to Problem

An optical amplification device according to one aspect of the present disclosure includes: an amplification unit that amplifies input light to generate output light; an excitation unit that supplies excitation light used for amplifying the input light, to the amplification unit; a resonance unit that includes a pair of first optical elements disposed to optically face each other with the amplification unit interposed between the first optical elements and that resonates generated light generated in the amplification unit through a supply of the excitation light; and an optical switch unit disposed on an optical path of the resonance unit between the pair of first optical elements.

In the optical amplification device, the generated light generated in the amplification unit is resonated by the supply of the excitation light, so that excitation energy remaining in the amplification unit after the amplification of the input light can be efficiently consumed. Since the optical switch unit is used for resonating the generated light, the timing of generating the resonance of the generated light is easily adjusted. For this reason, the resonance of the generated light can be generated before the excitation energy remaining in the amplification unit after the amplification of the input light is converted into thermal energy. Therefore, in the optical amplification device, the conversion of the excitation energy into thermal energy inside the amplification unit can be suppressed, and an increase in the size of or an increase in the electric power consumption of a cooling device attached to the amplification unit can be avoided. In addition, in the optical amplification device, since resonance is generated using the generated light generated in the amplification unit by the supply of the excitation light, a possibility that the resonance affects the quality of the input light or the output light can be reduced, and the disposition of an additional light source or the like for generating resonance is also not required.

The pair of first optical elements may be formed of a high reflectance mirror and a low reflectance mirror. In this case, the generated light can be gradually extracted from the low reflectance mirror to the outside, as laser light. Therefore, the conversion of the generated light into thermal energy in the amplification unit can be suppressed.

The optical path of the resonance unit may be different from an optical path of the input light. The optical path of the resonance unit and the optical path of the input light are separated, so that the resonance of the generated light can be more reliably prevented from affecting the quality of the input light or the output light.

At least a pair of the excitation units may be disposed to optically face each other with the amplification unit interposed between the excitation units, and a second optical element that transmits one of the excitation light and the generated light and reflects the other may be disposed on an optical path between each of the excitation units and the amplification unit. The output light having a beam profile with good symmetry can be obtained by such disposition of the excitation units. On the other hand, when the excitation units optically face each other, the generated light generated in the amplification unit is repeatedly reflected between the pair of excitation units, so that unintended oscillation (parasitic oscillation) may occur. When parasitic oscillation occurs, the excitation energy supplied to the amplification unit is consumed before the amplification of the input light, which is a problem. On the other hand, the second optical element is disposed on the optical path between each of the excitation units and the amplification unit, so that the repeated reflection of the generated light between the pair of excitation units can be suppressed and the occurrence of parasitic oscillation can be prevented.

The resonance unit may resonate the generated light that has been reflected by or has transmitted through the second optical element. In this case, an optical path of the excitation light and the optical path of the resonance unit can coincide with each other in the amplification unit. Accordingly, the excitation energy remaining in a portion of the amplification unit in which the optical path of the input light and the optical path of the excitation light do not coincide with each other can be efficiently consumed.

A pair of third optical elements that transmit one of P-polarized light and S-polarized light and reflect the other may be disposed on an optical path of the input light to interpose the amplification unit between the third optical elements, and the optical path of the resonance unit may be the same as at least a part of the optical path of the input light. In this case, since the optical path of the input light and at least the part of the optical path of the resonance unit are common to each other, the configuration of the device is simplified.

An optical amplification method according to one aspect of the present disclosure includes: an excitation step of exciting an amplification unit by supplying excitation light to an amplification unit; an amplification step of generating output light by supplying input light to the amplification unit to which the excitation light is supplied, and by amplifying the input light; and a resonance step of generating a resonance of generated light between a pair of first optical elements forming a resonance unit using an optical switch unit disposed between the pair of first optical elements, the generated light being generated in the amplification unit by a supply of the excitation light.

In the optical amplification method, the generated light generated in the amplification unit is resonated by the supply of the excitation light, so that the excitation energy remaining in the amplification unit after the amplification of the input light can be efficiently consumed. Since the optical switch unit is used for resonating the generated light, the timing of generating the resonance of the generated light is easily adjusted. For this reason, the resonance of the generated light can be generated before the excitation energy remaining in the amplification unit after the amplification of the input light is converted into thermal energy. Therefore, in the optical amplification method, the conversion of the excitation energy into thermal energy inside the amplification unit can be suppressed, and an increase in the size of or an increase in the electric power consumption of a cooling device attached to the amplification unit can be avoided. In addition, in the optical amplification method, since resonance is generated using the generated light generated in the amplification unit by the supply of the excitation light, a possibility that the resonance affects the quality of the input light or the output light can be reduced, and the disposition of an additional light source or the like for generating resonance is also not required.

The resonance step may be provided after the amplification step. In this case, the excitation energy remaining in the amplification unit after the amplification of the input light can be effectively consumed by the resonance of the generated light. Therefore, the conversion of the excitation energy into thermal energy inside the amplification unit can be more reliably suppressed.

In the excitation step and in the amplification step, the resonance of the generated light may be restricted by the optical switch unit. In this case, in the excitation step and in the amplification step, the consumption of the excitation energy of the amplification unit by the resonance of the generated light can be prevented. Therefore, a possibility that the resonance affects the quality of the output light can be reduced.

Advantageous Effects of Invention

According to the present disclosure, thermal energy can be efficiently prevented from remaining in the amplification unit without affecting the quality of the input light or the output light.

DESCRIPTION OF EMBODIMENTS

Hereinafter, an exemplary embodiment of an optical amplification device and an optical amplification method according to one aspect of the present disclosure will be described in detail with reference to the drawings.

First Embodiment

Figure 1:
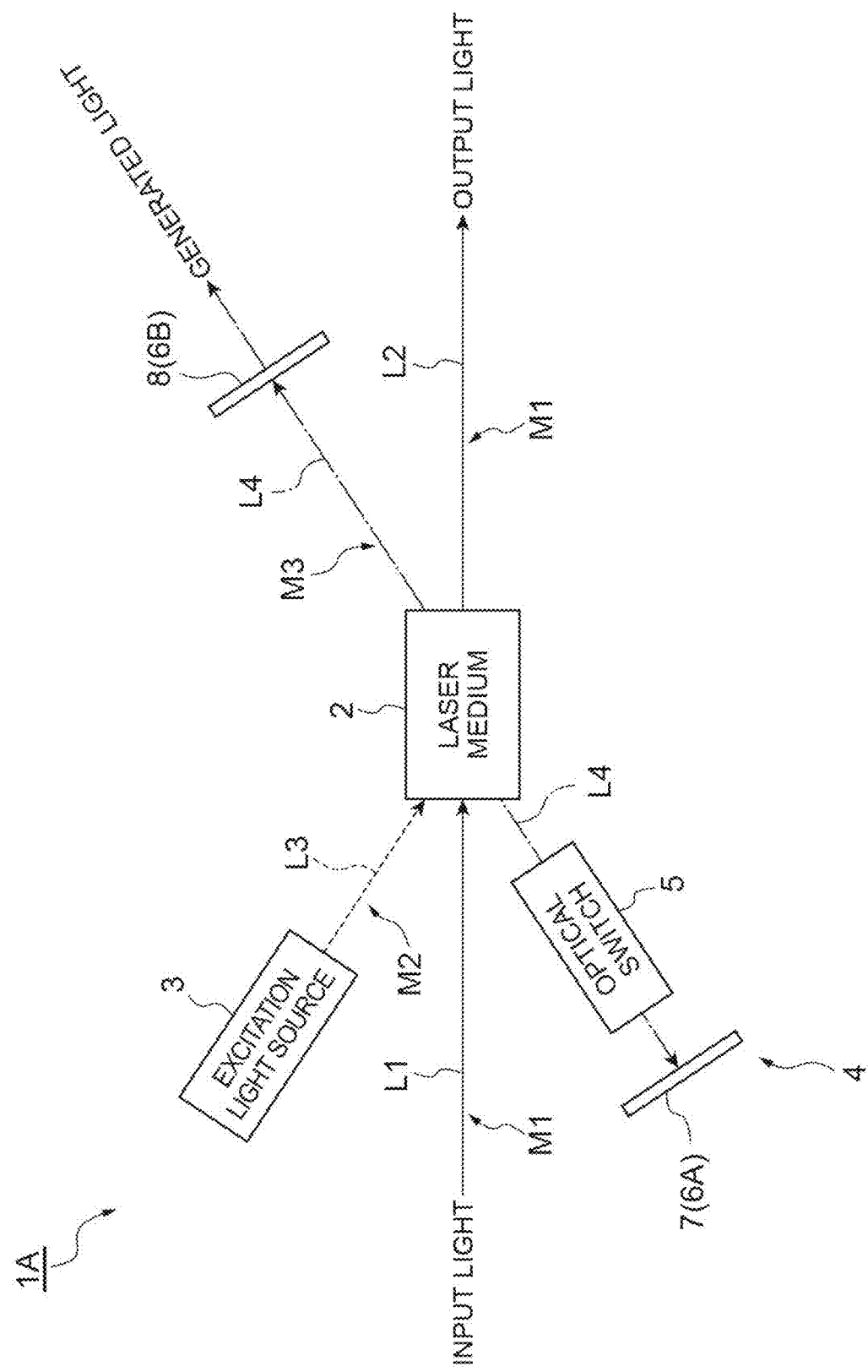
FIG. 1 is a schematic configuration diagram showing an optical amplification device according to a first embodiment.

FIG. 1 is a schematic configuration diagram showing an optical amplification device according to a first embodiment. An optical amplification device 1A shown in the same drawing is a device that amplifies input light L1 to output the obtained amplified light as output light L2. As shown in FIG. 1, the optical amplification device 1A includes a laser medium (amplification unit) 2, an excitation light source (excitation unit) 3, a resonator (resonance unit) 4, and an optical switch (optical switch unit) 5.

The laser medium 2 is a portion that amplifies the input light L1 to generate the output light L2. The input light L1 that is an amplification source is also referred to as seed laser light and is supplied to the laser medium 2 along a first optical path M1. Examples of a light source (not shown) that outputs the input light L1 include a solid-state laser, a fiber laser, a semiconductor laser, and the like. A wavelength of the input light L1 output from the light source is, for example, 1030 nm. The laser medium 2 is made of a substance that amplifies light by causing induced release to occur faster than light absorption. As the laser medium 2, for example, Yb:YAG, Nd:YAG, Nd:glass, Yb:glass, Nd:YLF, Yb:YLF, Ti:sapphire, Er:Y$_2$O$_3$, Er:YAG, Ho:YAG, Er:YVO$_4$, Yb:YVO$_4$, Nd:YVO$_4$, Tm:YAG, Tin:YLF, or the like is used. The laser medium 2 is disposed in a vacuum container (not shown) and, additionally, is cooled at a low temperature of approximately −200° C. to 10° C. The laser medium 2 may be cooled at approximately 10° C. to 30° C. by water or the like.

The excitation light source 3 is a light source that supplies excitation light L3 used for amplifying the input light L1, to the laser medium 2. For example, a semiconductor laser is used as the excitation light source 3. In the present embodiment, a wavelength of the excitation light L3 output from the excitation light source 3 is, for example, 940 nm. The excitation light L3 is supplied to the laser medium 2 along a second optical path M2 different from the first optical path M1 along which the input light L1 is supplied, and supplies excitation energy to the laser medium 2. When the input light L1 is supplied to the laser medium 2 in a state where the excitation light L3 is supplied, the input light L1 is amplified in the laser medium 2, and the output light L2 is generated by the amplified input light L1. The output light L2 is output from the laser medium 2 coaxially with the first optical path M1 along which the input light L1 is supplied, and is extracted to the outside of the optical amplification device 1A.

The resonator 4 is a portion that resonates light generated (hereinafter, generated light L4) in the laser medium 2 through the supply of the excitation light L3. The generated light L4 is mainly fluorescence, but light other than fluorescence such as phosphorescence may be the generated light L4. In the present embodiment, the generated light L4 is, for example, fluorescence having a wavelength of 1030 nm. Generally, the generated light L4 is emitted in all directions around a position where the excitation light L3 incident on the laser medium 2 is absorbed. At this time, the excitation light L3 is absorbed exponentially with respect to a distance by which the excitation light L3 propagates through the laser medium 2.

The resonator 4 is formed of, for example, a pair of first optical elements 6A and 6B disposed to optically face each other with the laser medium 2 interposed therebetween. Here, the first optical element 6A is a high reflectance mirror 7 having a relatively high reflectance for the generated light L4, and the first optical element 6B is a low reflectance mirror 8 having a relatively low reflectance for the generated light. Some components of the generated light L4 generated in the laser medium 2 are repeatedly reflected between the high reflectance mirror 7 and the low reflectance mirror 8 and pass through the laser medium 2 each time of reflection, the some components spreading in a direction coinciding with a third optical path M3 of the resonator 4, so that the excitation energy remaining in the laser medium 2 after the amplification of the input light L1 is consumed. The some components of the generated light L4 become laser light by being repeatedly reflected between the high reflectance mirror 7 and the low reflectance mirror 8, and are gradually extracted from a low reflectance mirror 8 side to the outside of the optical amplification device 1A.

Incidentally, residual components of the generated light L4 generated in the laser medium 2 are repeatedly reflected, scattered, or absorbed by a holder, a light-shielding body, or the like, the residual components not being incident on the resonator 4. Some of the residual components return to the laser medium 2 or hit other elements or the like and thus can be converted into thermal energy. In addition, an element on which the some components of the generated light L4 extracted from the low reflectance mirror 8 side are incident may be disposed outside the optical amplification device 1A, and the some components of the generated light L4 may be converted into thermal energy in the element.

The optical switch 5 is a portion that switches the loss of light on the third optical path M3 of the resonator 4 between increase and decrease modes. The optical switch 5 is disposed on the third optical path M3 between the pair of first optical elements 6A and 6B. In the example of FIG. 1, the optical switch 5 is disposed on the third optical path M3 between the high reflectance mirror 7 and the laser medium 2. As the optical switch 5, for example, an electro-optic modulator such as a Pockels cell, an acousto-optic modulator such as a Bragg cell, a magneto-optic modulator such as a Faraday rotator, a polarizing element such as a waveplate or a polarizer, or the like can be used. In addition, the optical switch 5 may be a high-speed mechanical shutter, a liquid crystal element, a spatial light modulation element, a supersaturated absorption element (Cr-added crystal, Cr-added ceramic, colored glass, or a semiconductor material), or the like.

The ON/OFF switching of the optical switch 5 is executed by a control unit (not shown). When the optical switch 5 is ON, the loss of light on the third optical path M3 decreases, and the resonance of the generated light L4 in the resonator 4 can be generated. When the optical switch 5 is OFF, the loss of light on the third optical path M3 increases, and resonance of the generated light L4 in the resonator 4 cannot be generated. From the viewpoint of preventing a decrease in the amplification efficiency of the input light L1 in the laser medium 2, the control unit sets the optical switch 5 to OFF at the timing when the amplification of the input light L1 is performed by the laser medium 2. The control unit switches the optical switch 5 from OFF to ON on the order of nanoseconds to microseconds after the input light L1 is amplified by the laser medium 2. Accordingly, before the excitation energy remaining in the laser medium 2 after the amplification of the input light L1 is converted into thermal energy, the resonance of the input light L1 in the resonator 4 is generated, and the excitation energy is consumed by the resonance of the generated light L4.

Figure 2:
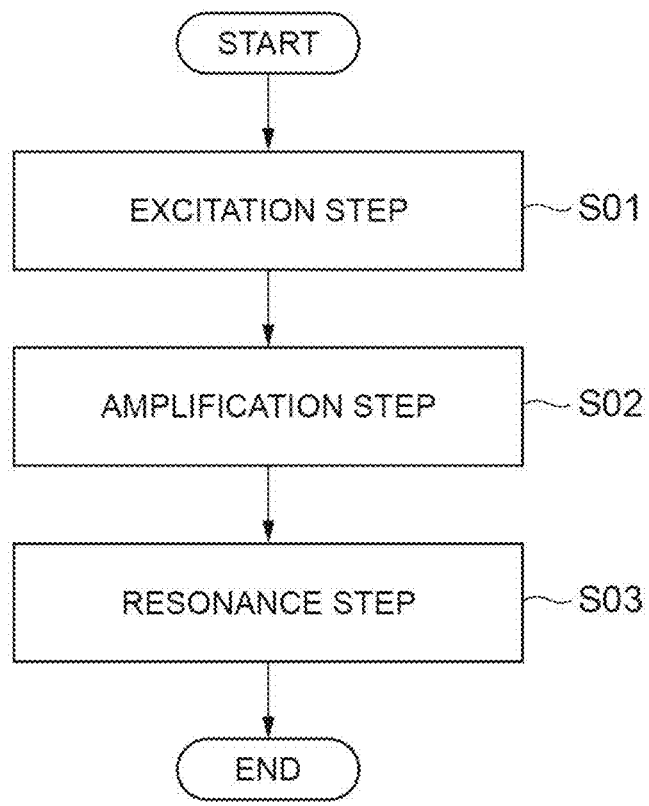
FIG. 2 is a flowchart showing one example of an optical amplification method using the optical amplification device.

FIG. 2 is a flowchart showing one example of an optical amplification method using the optical amplification device. As shown in the same drawing, the optical amplification method includes an excitation step (step S01), an amplification step (step S02), and a resonance step (step S03).

In the excitation step and in the amplification step, the optical switch 5 is set to OFF, and the resonance of the generated light L4 in the resonator 4 is restricted, the generated light L4 being generated in the laser medium 2. In the excitation step, the excitation light L3 is supplied from the excitation light source 3 to the laser medium 2 to excite the laser medium 2. In the amplification step following the excitation step, the input light L1 is supplied to the laser medium 2 excited by the excitation light L3. Accordingly, the input light L1 is amplified in the laser medium 2 and the output light L2 is generated by the amplified input light L1. The output light L2 is output from the laser medium 2 coaxially with the first optical path M1 along which the input light L1 is supplied, and is extracted to the outside of the optical amplification device 1A.

In the resonance step, after the input light L1 is amplified by the laser medium 2 in the amplification step, the optical switch 5 is switched to ON on the order of nanoseconds to microseconds. Accordingly, some components of the generated light L4 generated in the laser medium 2 in the amplification step are repeatedly reflected between the high reflectance mirror 7 and the low reflectance mirror 8 and pass through the laser medium 2 each time of reflection, the some components spreading in the direction coinciding with the third optical path M3 of the resonator 4, so that the excitation energy remaining in the laser medium 2 after the amplification of the input light L1 is consumed. The some components of the generated light L4 become laser light by being repeatedly reflected between the high reflectance mirror 7 and the low reflectance mirror 8, and are gradually extracted from the low reflectance mirror 8 side to the outside of the optical amplification device 1A.

As described above, in the optical amplification device 1A and the optical amplification method, the generated light L4 generated in the laser medium 2 is resonated by the supply of the excitation light L3, so that the excitation energy remaining in the laser medium 2 after the amplification of the input light L1 can be efficiently consumed. Since the optical switch 5 is used for resonating the generated light L4, the timing of generating the resonance of the generated light L4 is easily adjusted. For this reason, the resonance of the generated light L4 can be generated before the excitation energy remaining in the laser medium 2 after the amplification of the input light L1 is converted into thermal energy. Therefore, in the optical amplification device 1A, the conversion of the excitation energy into thermal energy inside the laser medium 2 can be suppressed, and an increase in the size of or an increase in the electric power consumption of a cooling device attached to the laser medium 2 can be avoided. In addition, in the optical amplification device 1A, since resonance is generated using the generated light L4 generated in the laser medium 2 by the supply of the excitation light L3, a possibility that the resonance affects the quality of the input light L1 or the output light L2 can be reduced, and the disposition of an additional light source or the like that generates resonance is also not required.

In addition, in the optical amplification device 1A, the pair of first optical elements 6A and 6B included in the resonator 4 are formed of the high reflectance mirror 7 and the low reflectance mirror 8. When both the pair of first optical elements 6A and 6B are formed of high reflectance mirrors, it is considered that the number of times that the generated light L4 passes through the laser medium until some components of the generated light L4 are extracted to the outside of the resonator 4 is too large, and some of the some components are converted into thermal energy inside the laser medium 2. On the other hand, since one of the pair of first optical elements 6A and 6B is the low reflectance mirror 8, the generated light L4 can be gradually extracted from the low reflectance mirror 8 to the outside, as laser light. Therefore, the conversion of the generated light L4 into thermal energy in the laser medium 2 can be suppressed.

In addition, in the optical amplification device 1A, the third optical path M3 of the resonator 4 is different from the first optical path M1 of the input light L1. In such a manner, the optical path of the resonator 4 and the optical path of the input light L1 are separated, so that the resonance of the generated light L4 can be more reliably prevented from affecting the quality of the input light L1 or the output light L2.

Second Embodiment

Figure 3:
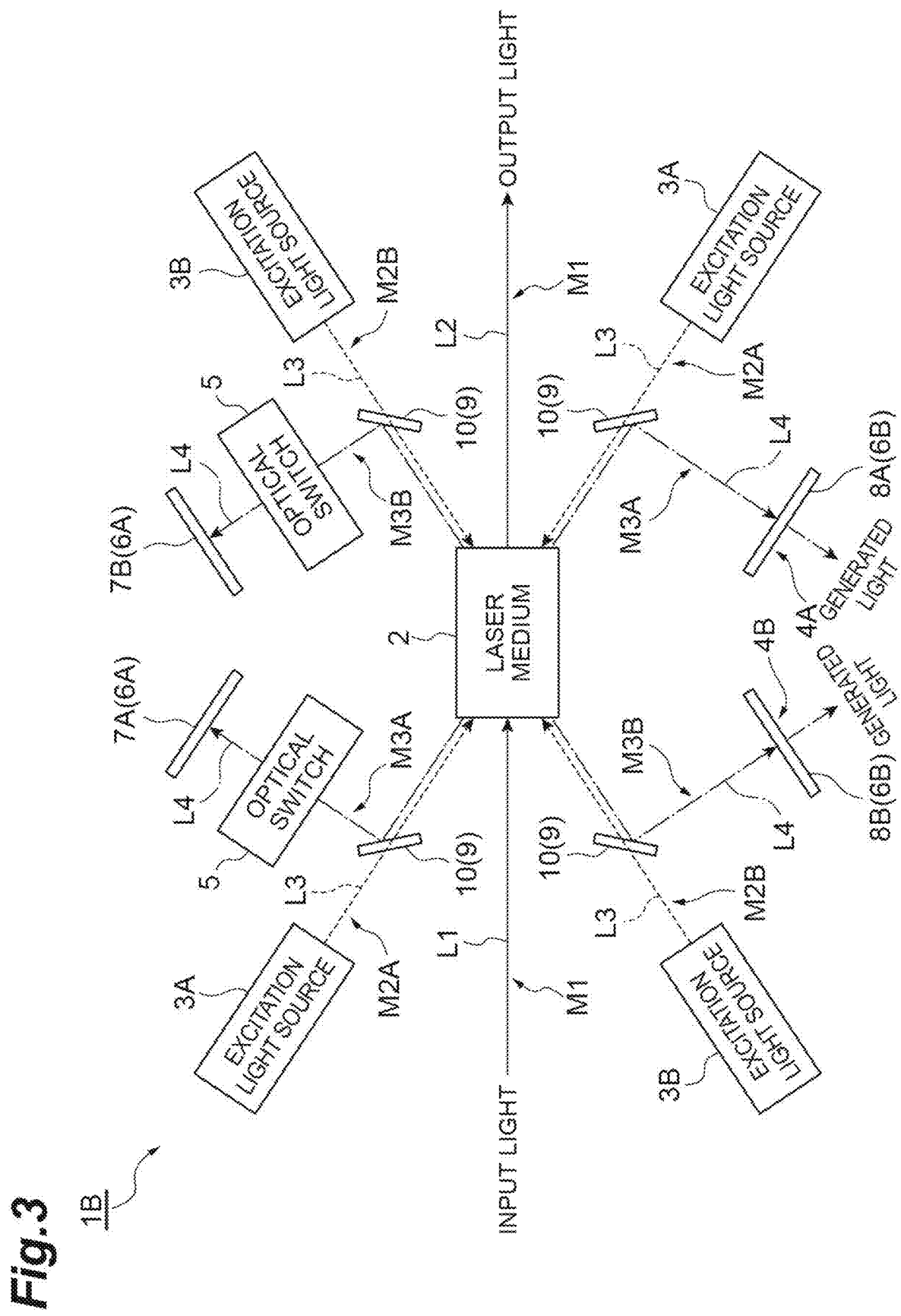
FIG. 3 is a schematic configuration diagram showing an optical amplification device according to a second embodiment.

FIG. 3 is a schematic configuration diagram showing an optical amplification device according to a second embodiment. As shown in the same drawing, in an optical amplification device 1B according to the second embodiment, a disposition configuration of the excitation light source 3 and the resonator 4 is different from that of the first embodiment.

More specifically, in the optical amplification device 1B, at least a pair of the excitation light sources 3 are disposed to optically face each other with the laser medium 2 interposed therebetween. In the example of FIG. 3, the optical amplification device 1B includes a pair of excitation light sources 3A and 3A that optically face each other with the laser medium 2 interposed therebetween, and a pair of excitation light sources 3B and 3B that optically face each other with the laser medium 2 interposed therebetween on an axis different from that of the pair of excitation light sources 3A and 3A.

Both a second optical path M2A of the excitation light L3 from the excitation light sources 3A and 3A toward the laser medium 2 and a second optical path M2B of the excitation light L3 from the excitation light sources 3B and 3B toward the laser medium 2 are optical paths different from the first optical path M1 along which the input light L1 is supplied. In addition, the second optical path M2A and the second optical path M2B are line symmetric with respect to the first optical path M1.

Second optical elements 9 each that transmit one of the excitation light L3 and the generated light L4 and reflect the other are disposed on the optical path between the excitation light sources 3A and 3A and the laser medium 2 and on the optical path between the excitation light sources 3B and 3B and the laser medium 2. The second optical elements 9 are, for example, wavelength selection mirrors 10 formed by coating a dielectric multilayer film, and in the example of FIG. 3, are configured to transmit the excitation light L3 and to reflect the generated light L4.

The optical switch 5 and a high reflectance mirror 7A are disposed on an optical path of the generated light L4 reflected by one wavelength selection mirror 10, and a low reflectance mirror 8A is disposed on an optical path of the generated light L4 reflected by the other wavelength selection mirror 10. In the optical amplification device 1B, on a third optical path M3A of a resonator 4A formed of the high reflectance mirror 7A and the low reflectance mirror 8A, an optical path between a pair of the wavelength selection mirrors 10 and 10 interposing the laser medium 2 therebetween is the same as the second optical path M2A of the excitation light L3, and optical paths between the one wavelength selection mirror 10 and the high reflectance mirror 7A and between the other wavelength selection mirror 10 and the low reflectance mirror 8A are different from the second optical path M2A of the excitation light L3. Similarly, on a third optical path M3B of a resonator 4B formed of a high reflectance mirror 7B and a low reflectance mirror 8B, an optical path between a pair of the wavelength selection mirrors 10 and 10 interposing the laser medium 2 therebetween is the same as the second optical path M2B of the excitation light L3, and optical paths between one wavelength selection mirror 10 and the high reflectance mirror 7B and between the other wavelength selection mirror 10 and the low reflectance mirror 8B are different from the second optical path M2B of the excitation light L3.

Even in the optical amplification device 1B, the same actions and effects as those of the optical amplification device 1A according to the first embodiment are exhibited, and thermal energy can be efficiently prevented from remaining in the laser medium 2 without affecting the quality of the input light L1 or the output light L2. In addition, in the optical amplification device 1B, since the excitation light sources 3 are disposed to optically face each other with the laser medium 2 interposed therebetween, the output light L2 having a beam profile with good symmetry can be obtained.

On the other hand, when the excitation light sources 3 optically face each other, the generated light L4 generated in the laser medium 2 is repeatedly reflected between the pair of excitation light sources 3 and 3 (for example, between emission end surfaces of the excitation light sources 3), so that unintended oscillation (parasitic oscillation) may occur. When parasitic oscillation occurs, the excitation energy supplied to the laser medium 2 is consumed before the amplification of the input light L1, which is a problem. Particularly, when a distance between the excitation light source 3 and the laser medium 2 is reduced to obtain high-power amplified light, or when a stack type semiconductor laser including a relatively large metal heat sink is used as the excitation light source 3, parasitic oscillation is likely to occur between the excitation light sources 3 and 3.

On the other hand, in the optical amplification device 1B, since the second optical elements 9 are disposed on the optical path between the excitation light sources 3 and the laser medium 2, even when the excitation light sources 3 are disposed to optically face each other with the laser medium 2 interposed therebetween, the generated light L4 can be prevented from being incident on the excitation light sources 3. Therefore, the repeated reflection of the generated light L4 between the pair of excitation light sources 3 and 3 can be suppressed, and the occurrence of parasitic oscillation can be prevented.

In addition, in the optical amplification device 1B, the resonator 4 oscillates the generated light L4 reflected by the second optical element 9. Accordingly, the second optical path M2 of the excitation light L3 and the third optical path M3 of the resonator 4 can coincide with each other in the laser medium 2. Therefore, the excitation energy remaining in a region where the third optical path M3 of the resonator 4 coincides with the second optical path M2 of the excitation light L3 in the laser medium 2 can be efficiently consumed by the resonator 4.

Figure 4:
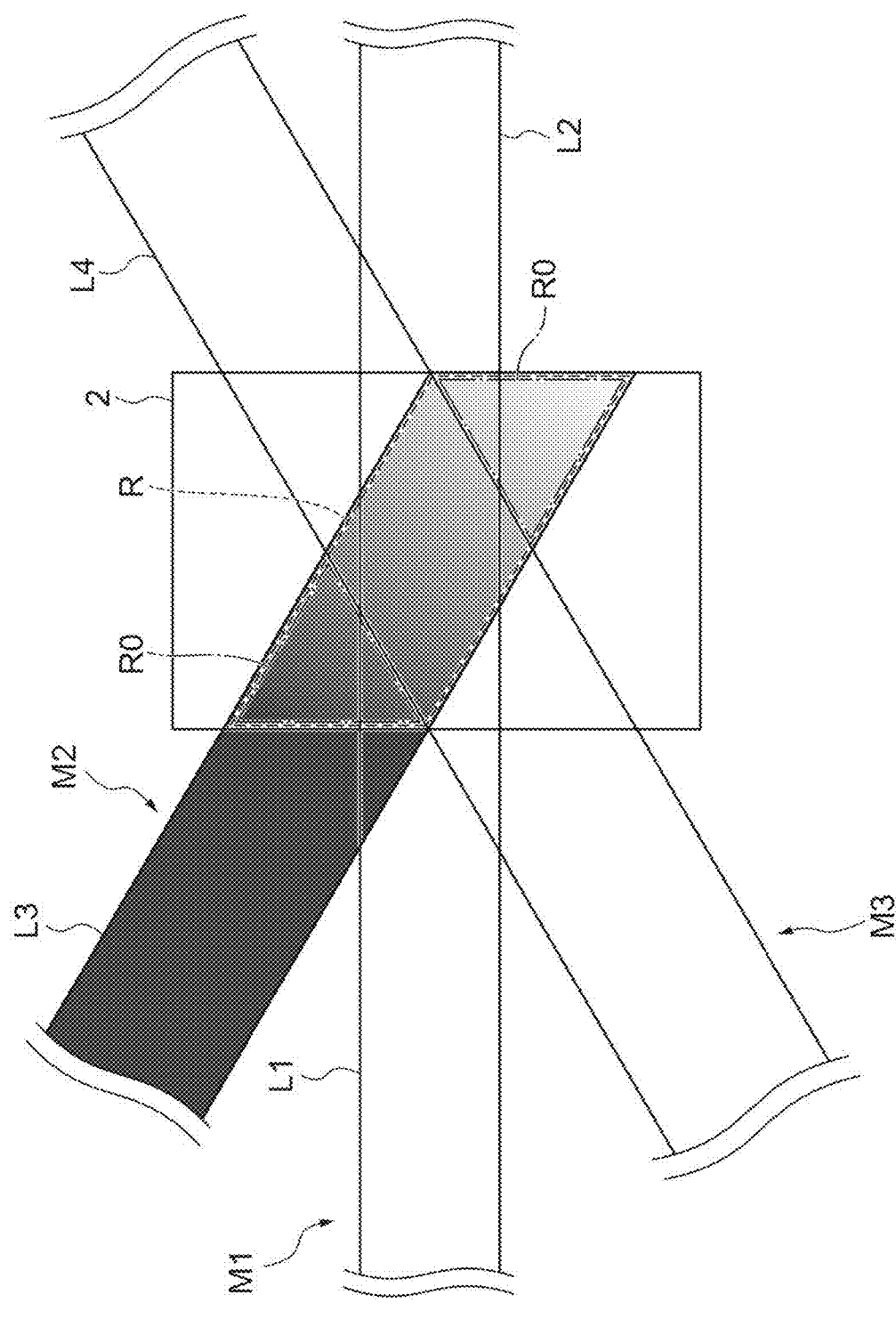
FIG. 4 is a diagram showing a relationship between a region where excitation energy is accumulated and a region where the excitation energy is consumed by resonance when an optical path of excitation light and an optical path of a resonator do not coincide with each other.
Figure 5:
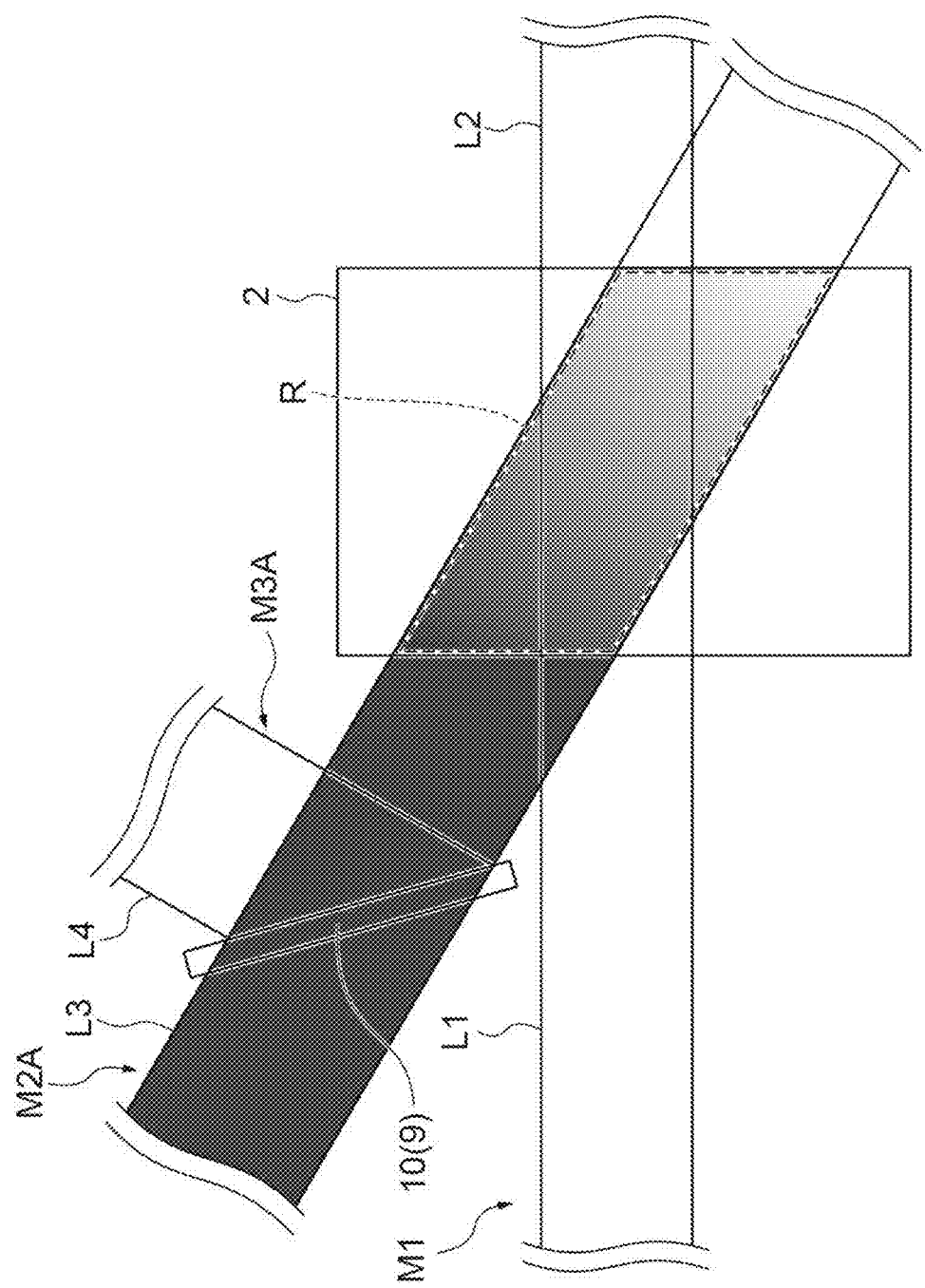
FIG. 5 is a diagram showing a relationship between a region where excitation energy is accumulated and a region where the excitation energy is consumed by resonance when the optical path of the excitation light and the optical path of the resonator coincide with each other.

FIGS. 4 and 5 are diagrams showing a relationship between a region where the excitation energy is accumulated and a region where the excitation energy is consumed by resonance. In these drawings, a distribution of the excitation energy is shown in gradations. For example, as shown in FIG. 4, when there is a portion of the laser medium 2 in which the first optical path M1 of the input light L1 and the second optical path M2 of the excitation light L3 do not coincide with each other, it is considered that the excitation energy remains in a region R0 within a region R where the excitation energy is accumulated in the laser medium 2, the second optical path M2 not coinciding with the third optical path M3 in the region R0. Particularly, an accumulation amount of the excitation energy in the region R0 is likely to be large on an incident side of the excitation light L3, and it is preferable that the excitation energy in this portion is efficiently consumed. On the other hand, as shown in FIG. 5, in the optical amplification device 1B, since the second optical path M2 of the excitation light L3 and the third optical path M3 of the resonator 4 coincide with each other in the laser medium 2, even when there is a portion in which the first optical path M1 of the input light L1 and the second optical path M2 of the excitation light L3 do not coincide with each other, the excitation energy remaining in the region R can be efficiently consumed.

Figure 6:
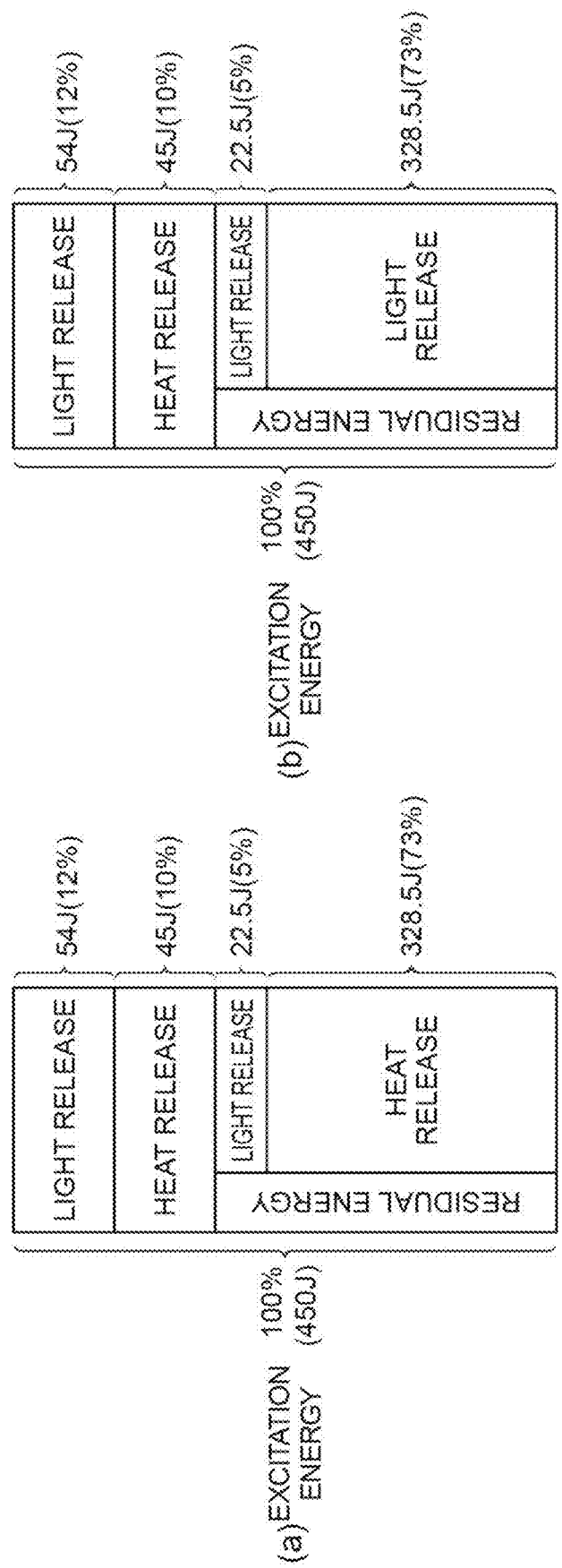
FIG. 6 is a diagram showing an effect of the optical amplification device according to the present disclosure.

FIG. 6 is a diagram showing an effect of the optical amplification device according to the present disclosure. In the same drawing, in a comparative example and an example of optical amplification devices, a ratio between energy released as heat and energy released as light of excitation energy supplied to the laser medium is shown. In the example, the optical amplification device having the same configuration as the configuration of the optical amplification device according to the second embodiment shown in FIG. 3 was used, and in the comparative example, the optical amplification device configured such that the resonator, the optical switch, and the second optical elements are removed from the configuration of the optical amplifier according to the second embodiment was used. In both examples, the excitation energy of the laser medium supplied by the excitation light was 450 J.

In the comparative example, as shown in FIG. 6(a), with respect to an excitation energy of 450 J (100%), an amount of energy released as light during amplification of the input light is 54 J (12%), and an amount of energy released as heat is 45 J (10%). In addition, an amount of the excitation energy remaining in the laser medium after the amplification of the input light is 351 J (78%), 22.5 J (5%) of the amount of the excitation energy is released as light, and a remainder of 328.5 J (73%) is released as heat. Namely, in the comparative example, an amount of thermal energy is 373.5 J (83%) in total with respect to an excitation energy of 450 J.

On the other hand, in the example, as shown in FIG. 6(b), an amount of energy released as light and heat during amplification of the input light and an amount of energy released as light of the excitation energy remaining in the laser medium after the amplification of the input light are in the same ratio as that in the comparative example, but an energy of 328.5 J released as heat of the excitation energy remaining in the laser medium after the amplification of the input light is consumed as light energy before being converted into thermal energy. For this reason, in the example, an amount of energy released as heat is merely 45 J (10%). Namely, in the example, 90% of the excitation energy can be extracted as light, and the amount of generated heat can be reduced to approximately ⅛ when compared to the comparative example.

Third Embodiment

Figure 7:
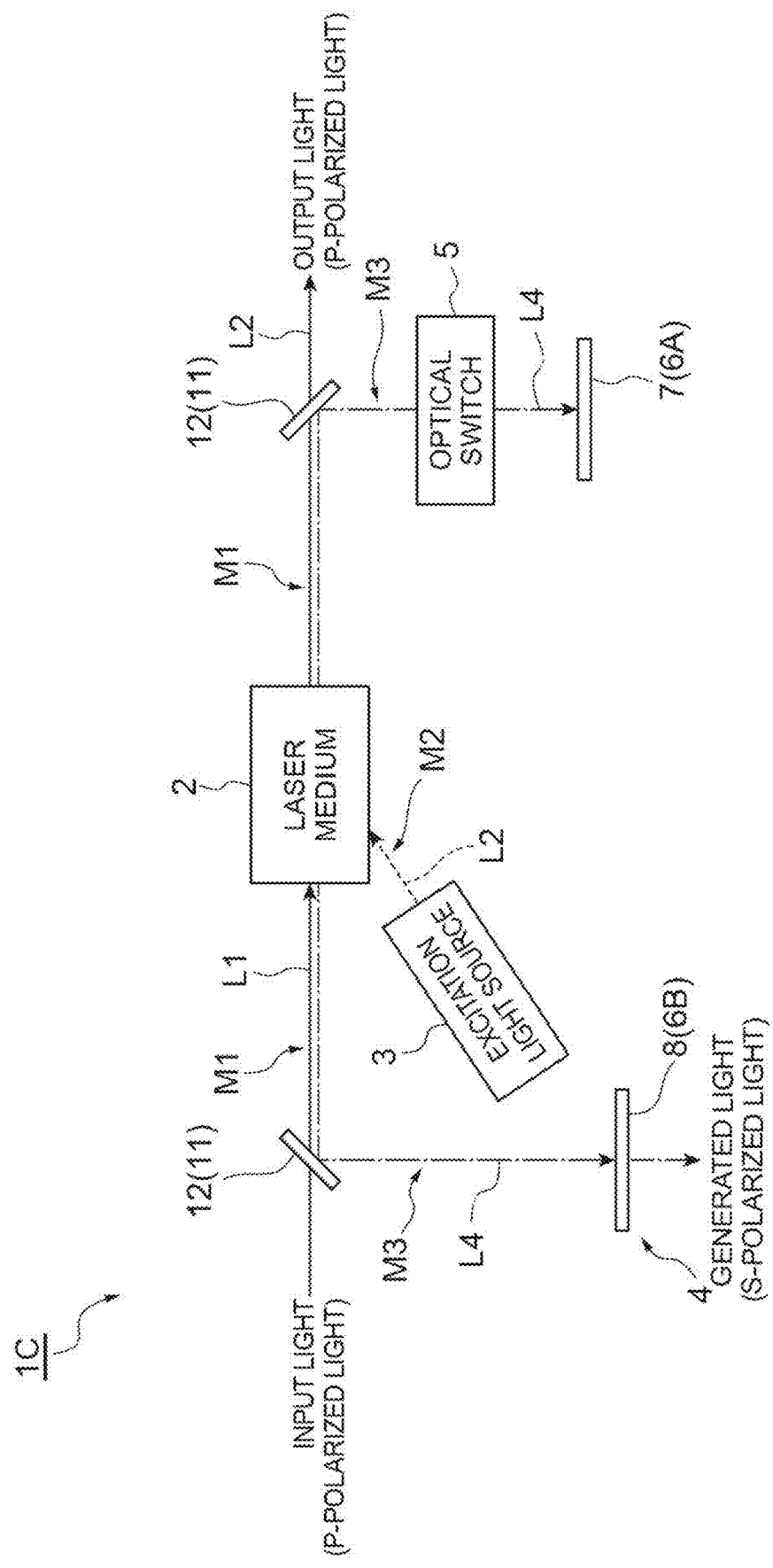
FIG. 7 is a schematic configuration diagram showing an optical amplification device according to a third embodiment.

FIG. 7 is a schematic configuration diagram showing an optical amplification device according to a third embodiment. As shown in the same drawing, an optical amplification device 1C according to the third embodiment is different from the first embodiment in that the third optical path M3 of the resonator 4 is the same as at least a part of the first optical path M1 of the input light L1.

More specifically, in the optical amplification device 1C, a pair of third optical elements 11 and 11 are disposed on the first optical path M1 of the input light L1 to interpose the laser medium 2 therebetween. The third optical elements 11 are, for example, polarization beam splitters 12, and in the example of FIG. 7, are configured to transmit P-polarized light and to reflect S-polarized light. The low reflectance mirror 8 is disposed on an optical path of the generated light L4 reflected by one polarization beam splitter 12, and the optical switch 5 and the high reflectance mirror 7 are disposed on an optical path of the generated light L4 reflected by the other polarization beam splitter 12.

In the optical amplification device 1C, on the third optical path M3 of the resonator 4, an optical path between a pair of the polarization beam splitters 12 and 12 interposing the laser medium 2 therebetween is the same as the first optical path M1 of the input light L1, and optical paths between the one polarization beam splitter 12 and the high reflectance mirror 7 and between the other polarization beam splitter 12 and the low reflectance mirror 8 are different from the first optical path M1 of the input light L1.

In the optical amplification device 1C, the input light L1 that is P-polarized is supplied to the laser medium 2. The input light that is P-polarized transmits through the one polarization beam splitter 12 and is supplied to the laser medium 2, and the output light L2 after being amplified in the laser medium 2 transmits through the other polarization beam splitter 12 and is extracted to the outside of the optical amplification device 1C. In the resonator 4, an S-polarized light component of the generated light L4 generated in the laser medium 2 is resonated to consume the excitation energy remaining in the laser medium 2 after the amplification of the input light L1.

Even in the optical amplification device 1C, the same actions and effects as those of the optical amplification device 1A according to the first embodiment are exhibited, and thermal energy can be efficiently prevented from remaining in the laser medium 2 without affecting the quality of the input light L1 or the output light L2. In addition, in the optical amplification device 1C, the pair of third optical elements 11 and 11 are disposed on the first optical path M1 of the input light L1 to interpose the laser medium 2 therebetween, and the third optical path M3 of the resonator 4 and at least a part of the first optical path M1 of the input light L1 are the same. Accordingly, the first optical path M1 of the input light L1 and at least the part of the third optical path M3 of the resonator 4 are common to each other, the configuration of the device is simplified.

Figure 8:
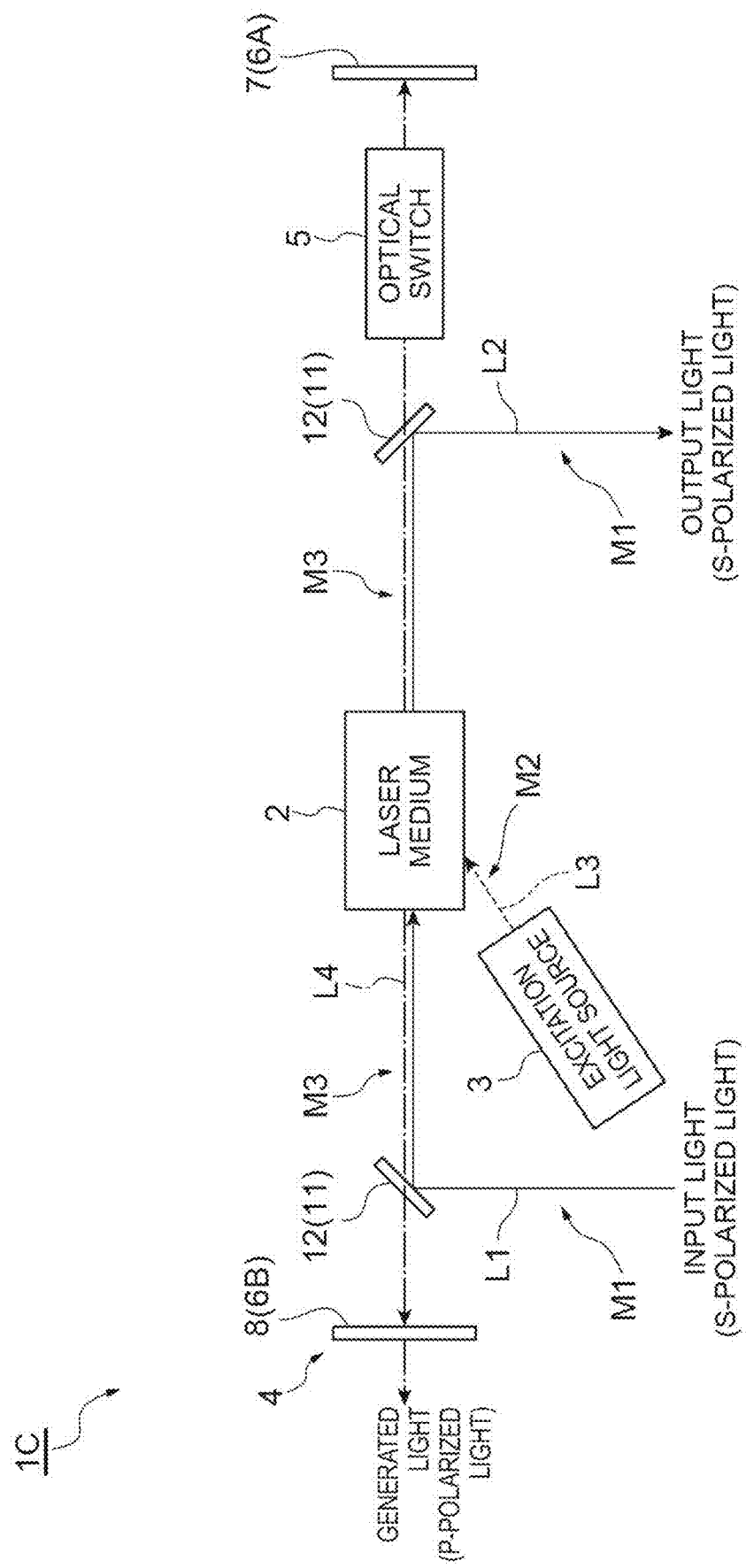
FIG. 8 is a schematic configuration diagram showing a modification example of FIG. 7.

The optical amplification device 1C can take other modifications. For example, in the example of FIG. 8, a disposition relationship between the first optical path M1 of the input light L1 and the third optical path M3 of the resonator 4 is reversed from the example of FIG. 7. Namely, in the example of FIG. 8, the input light L1 that is S-polarized is reflected by the one polarization beam splitter 12 and is supplied to the laser medium 2, and the output light L2 after being amplified in the laser medium 2 is reflected in the other polarization beam splitter 12 and is extracted to the outside of the optical amplification device 1C. In the resonator 4, a P-polarized light component of the generated light L4 generated in the laser medium 2 is resonated by transmitting through the polarization beam splitters 12 and 12, to consume the excitation energy remaining in the laser medium 2 after the amplification of the input light L1.

Figure 9:
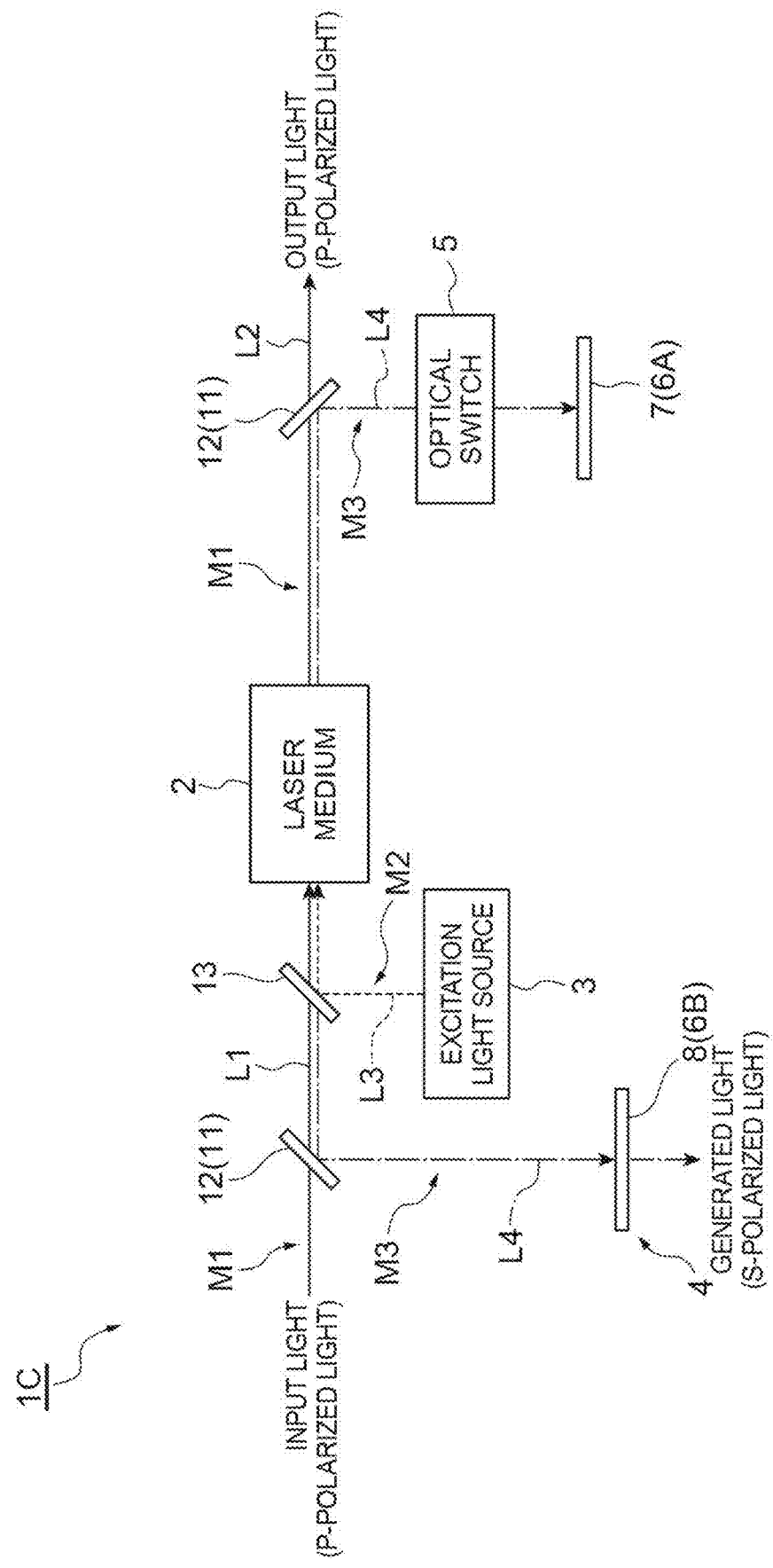
FIG. 9 is a schematic configuration diagram showing another modification example of FIG. 7.

In addition, in the example of FIG. 9, the second optical path M2 of the excitation light L3 is different from the example of FIG. 7. In the example of FIG. 9, a wavelength selection mirror 13 that reflects the excitation light L3 and transmits the input light L1 and the generated light L4 is disposed on an optical path between the laser medium 2 and the one polarization beam splitter 12. Accordingly, the excitation light L3 supplied from the excitation light source 3 is reflected by the wavelength selection mirror 13 and is incident on the laser medium 2 coaxially with the first optical path M1 of the input light L1 and with the third optical path M3 of the resonator 4.

Even in such a modification example, the same actions and effects as those of the optical amplification device 1A according to the first embodiment are exhibited, and thermal energy can be efficiently prevented from remaining in the laser medium 2 without affecting the quality of the input light L1 or the output light L2. In addition, since the first optical path M1 of the input light L1 and at least a part of the third optical path M3 of the resonator 4 are common to each other, the configuration of the device is simplified.

Modification Example

The present disclosure is not limited to the embodiments. For example, in the embodiments, the resonator 4 is con- figured by using the high reflectance mirror 7 and the low reflectance mirror 8, but optical attenuation means such as an optical shutter may be disposed on the third optical path M3 of the resonator 4. In this case, the generated light L4 can be blocked inside the device by resonating the generated light L4 for a certain period of time and then by attenuating the generated light L4 using the optical attenuation means.

REFERENCE SIGNS LIST 1A to 1C: optical amplification device, 2: laser medium (amplification unit), 3, 3A, 3B: excitation light source (excitation unit), 4, 4A, 4B: resonator (resonance unit), 5: optical switch (optical switch unit), 6A, 6B: first optical element, 7: high reflectance mirror, 8: low reflectance mirror, 9: second optical element, 11: third optical element, L1: input light, L2: output light, L3: excitation light, L4: generated light.

The invention claimed is:

1. An optical amplification device comprising:
an amplification unit configured to amplify input light to generate output light;
an excitation unit configured to supply excitation light used for amplifying the input light, to the amplification unit;
a resonance unit configured to include a pair of first optical elements disposed to optically face each other with the amplification unit interposed between the first optical elements and configured to resonate generated light generated in the amplification unit through a supply of the excitation light; and
an optical switch unit configured to be disposed on an optical path of the resonance unit between the pair of first optical elements,
wherein the pair of first optical elements are formed of a high reflectance mirror and a low reflectance mirror, and
wherein the optical path of the resonance unit is different from an optical path of the input light.

2. An optical amplification device comprising:
an amplification unit configured to amplify input light to generate output light;
an excitation unit configured to supply excitation light used for amplifying the input light, to the amplification unit;
a resonance unit configured to include a pair of first optical elements disposed to optically face each other with the amplification unit interposed between the first optical elements and configured to resonate generated light generated in the amplification unit through a supply of the excitation light; and
an optical switch unit configured to be disposed on an optical path of the resonance unit between the pair of first optical elements,
wherein at least a pair of the excitation units are disposed to optically face each other with the amplification unit interposed between the excitation units, and
a second optical element configured to transmit one of the excitation light and the generated light and configured to reflect the other is disposed on an optical path between each of the excitation units and the amplification unit.

3. The optical amplification device according to claim 2, wherein the resonance unit resonates the generated light that has been reflected by or has transmitted through the second optical element.

4. The optical amplification device according to claim 1,
wherein a pair of third optical elements configured to transmit one of P-polarized light and S-polarized light and configured to reflect the other are disposed on an optical path of the input light to interpose the amplification unit between the third optical elements, and
the optical path of the resonance unit is the same as at least a part of the optical path of the input light.

5. An optical amplification method comprising:
exciting an amplification unit by supplying excitation light to an amplification unit;
generating output light by supplying input light to the amplification unit to which the excitation light is supplied, and by amplifying the input light; and
generating a resonance of generated light between a pair of first optical elements forming a resonance unit using an optical switch unit disposed between the pair of first optical elements, the generated light being generated in the amplification unit by a supply of the excitation light,
wherein the pair of first optical elements are formed of a high reflectance mirror and a low reflectance mirror, and
wherein the optical path of the resonance unit is different from an optical path of the input light.

6. The optical amplification method according to claim 5,
wherein the generating a resonance is provided after the generating output light.

7. The optical amplification method according to claim 5,
wherein in the excitation and in the generating output light, the resonance of the generated light is restricted by the optical switch unit.

* * * * *